United States Patent Office 2,881,086
Patented Apr. 7, 1959

2,881,086

ADHESIVES AND METHOD OF MANUFACTURING THE SAME

Ernest L. Wimmer, Elm Grove, Wis., assignor to Chas. A. Krause Milling Co., Milwaukee, Wis., a corporation of Wisconsin No Drawing. Application April 12, 1956
Serial No. 577,675

3 Claims. (Cl. 106—213)

This invention relates to improvements in adhesives and method of manufacturing the same.

Patent No. 2,051,025 describes a process for the manufacturing of corrugated board whereby a free flowing adhesive composed of ungelatinized starch suspended in a viscous carrier is applied to the flutes of a corrugated paper medium which is then contacted with a paper liner. Upon application of heat, the starch is gelatinized and an adhesive bond between the liner and corrugated medium is rapidly created. It would be advantageous to employ degerminated cereal flours and tuber flours, particularly degerminated corn flour in this application because their cost is significantly less than the cost of corresponding starches, and it has been found that when flour such as corn flour, which is approximately 90% starch, is substituted for corn starch, a satisfactory adhesive bond can be created in the manufacture of corrugated board. However, when an adhesive composition is prepared according to Patent No. 2,051,025, but using degerminated corn flour to replace corn starch, the resulting material has been found to be very difficult to handle in large scale equipment. It was found that custard-like masses formed in the storage tanks when agitation was insufficient; that the apparent viscosity in the glue pans rose sharply; that the glue rolls were picking up heavy films from the pans; and it was found that where agitation and flow in the pans was insufficient, the paste formed semi-solid masses which the glue roll hollowed out so that the pickup by the roll would cease. This phenomenom is known as thixotropy.

It is a general object of this invention to eliminate the above mentioned problems and provide an adhesive produced from starch bearing materials or flours, such as cereal flours and tuber flours; and, in the preferred embodiment of this invention, degerminated corn flour, which will meet the requirements of the corrugated box industry.

More specifically it is an object of this invention to produce an adhesive from such materials which will operate satisfactorily with the same equipment which is now used to produce corrugated board with a starch type adhesive as described in United States Patent No. 2,051,025.

It is a further object of this invention to produce a corrugating adhesive with superior flow and spread properties (rheological properties).

A further object of the invention is to provide an adhesive as above described which permits the utilization of low-cost cereal flours, tuber flours or other impure starch bearing materials which are ordinarily inoperable in a corrugating system because of the high degree of thixotropy, such flours or materials to be used in place of all or a portion of the higher priced starches now used in corrugating adhesive manufacture.

A further object of the invention is to provide a corrugating adhesive having ideal spread characteristics which are equivalent to or superior to those produced with pearl corn starch using a regular cooked starch paste as the carrier or suspending agent.

A further object of the invention is to provide an adhesive which utilizes for the carrier portion a starchy material which is substantially devoid of amylose fractions of a linear nature, i.e., which is either amylose-free, of reduced amylose content, or in which the amylose fraction contains sufficient chemical branches that its viscosity is no longer affected by unsaturated free fatty acid.

With the above and other objects in view, the invention consists of the improved adhesive and all of its parts and combinations, as set forth in the claims, and all equivalents thereof.

The thixotropic behavior of an adhesive can best be evaluated by use of the Brookfield synchroelectric viscometer. This instrument employs a disc revolving at a constant speed and a spindle attached to the center of the disc by a calibrated spring. The spindle is immersed in the test solution and the rotation of the disc is begun. The immersed spindle will soon rotate at the same speed as the disc; however, it will lag behind a definite number of angular degrees depending upon the resistance to rotation or resistance to shear afforded by the test solution. The angular degrees of the lag are calibrated in viscosity units (centipoise). The loose molecular network which sets up in certain systems upon standing is responsible for the phenomenon of thixotropy; it is broken up to various degrees by the rotating spindle of the Brookfield viscometer dependent upon the speed of rotation, i.e., the higher the speed, the more the network is disrupted and hence, the lower the apparent viscosity at high speeds of rotation. Throughout this application the degree of thixotropy will be referred to by the "2/20 value" or thixotropic index i.e. the ratio of the apparent viscosities as measured by Brookfield viscometer at spindle speeds of 2 r.p.m. and 20 r.p.m.

In brief, an adhesive for preparation of corrugated paper board in accordance with the former practice of Patent No. 2,051,025 is prepared as follows: a portion of starch (about 15% of that in the total adhesive) is suspended in water, treated with caustic soda to aid in the dispersion of the starch, and then heated to gelatinize and disperse the starch; the cooked material is then cooled by dilution with water so that a 5–7% smooth-flowing starch solution is obtained. This cooked paste serves as the carrier for the rest of the adhesive. The major portion of the starch (about 85%) is then suspended in water containing borax. This starch is in the native granule or raw state and its gelatinization on the corrugating machine at the liner-medium interface after application of heat is responsible for the quick bond. The cooked carrier is then added and after thorough mixing, the adhesive is ready for use. The usual viscosity of the adhesive at this point is 20–80 sec. These viscosities are measured by the time for 100 ml. of paste to flow through a calibrated orifice in a "viscosity cup" which is standard in the corrugating board industry for the determination of viscosity of starch adhesive.

The carrier gives body to the paste and keeps the raw starch in suspension, and the borax forms a complex compound with the starch in solution and contributes valuable flowability and "pickup" or film forming properties to the paste as well as being indispensable to giving a quick firm set at the glue line during preparation of the board. The caustic is not only valuable as an aid in obtaining a smoothly dispersed carrier, but is also used to control the temperature at which the raw starch will gelatinize on the machines, i.e., the higher the caustic, the lower is the "gel point."

I have found that the thixotropic behavior of pastes prepared with corn flour is due to a reaction between the dispersed starch of the carrier portion of the paste and the sodium soaps of the unsaturated free fatty acids which are extracted from the flour by the alkaline medium. More specifically, a loosely bonded molecular structure between oleic and linoleic salts and the amylose or linear fraction of the starch is responsible for this phenomenon. There are two major fractions of ordinary starch—the linear amylose fraction and the branched amylopectin fraction. The former represents about 25% of ordinary corn starch and is responsible for starch paste gelling when cooled. Fatty acids form complex compounds with amylose at neutral pH and this reaction inhibits the amylose from setting up to a rigid gel. However, in the highly alkaline system characteristic of corrugating paste, in a pH range of 11–12.7, amylose will not gel but will remain fluid. I have observed that the fluidity of alkaline starch pastes are unaffected by saturated fatty acids such as stearic, whereas the unsaturated fatty acids such as oleic and linoleic, cause the formation of a loosely bound gel which I have described as thixotropy. Although certain natural gums which do not yield a thixotropic reaction under these conditions may be used for the carrier it is, nevertheless, advantageous for reasons of economy to use a starch base material.

According to the present invention the aforementioned objectionable reaction between amylose and unsaturated free fatty acid is eliminated and the resulting paste has ideal rheological characteristics.

EMBODIMENTS OF THE INVENTION

To accomplish the purpose of the present invention I eliminate the normal "free amylose" characteristics from the starchy carrier. This may be accomplished by use of three embodiments of the invention: Embodiment I.—Utilization of a starchy carrier in which the starch, particularly the amylose fraction has been chemically modified by branching agents; Embodiment II.—Incorporation in the starchy carrier of a branching agent so the starch modification occurs in situ during the preparation of the carrier portion of the adhesive; Embodiment III.—Utilization of an amylose-free starchy material or starchy material of reduced amylose content as the carrier portion of the adhesive.

Embodiment I.—In this embodiment the starch used for preparing the carrier is chemically modified by a branching agent so that the amylose fraction, originally of a linear nature, now contains sufficient chemical branches so that the viscosity is no longer affected by unsaturated free fatty acid in the adhesive. It has been found that 1 to 10 branches for each 30 anhydroglucose units is effective in reducing the thixotropy. Typical modifications are those containing hydroxyalkyl groups such as hydroxyethyl (Penford Gums, Tenofilms) and hydroxypropyl groups. These are produced by the interaction of the corresponding alkylene oxide such as ethylene oxide and propylene oxide with ordinary starch or starch bearing material. Other satisfactory modified starches are those containing carboxymethyl groups (Solvitose HCV) such as those produced by the interaction of chloroacetic acid with starch materials or containing carboxyethyl groups such as introduced by the interaction of starchy materials with acrylonitrile followed by alkaline hydrolysis. Carbamidoethyl starches and cyanoethyl starches are also readily prepared starch modifications which can be used as the carrier portion of the adhesive which is not subject to thixotropic behavior.

The following examples are illustrative of Embodiment I of the invention wherein a chemically modified starch or starch bearing flour containing synthetic branches is used as the carrier portion of the adhesive:

*Exmple Ia.*—A hydroxyethyl starch (Penford Gum 200) (1.5 lbs.) is slurried in 1.0 gallon of water; a solution of 0.30 lb. of caustic soda dissolved in an equal weight of water is added and the temperature is raised to 170° F. After 15 min. the cooked material is cooled by dilution to 2.0 gallons with cold water and the resultant solution then serves as the carrier portion of the adhesive. Thus 10.5 lbs. of corn flour is suspended in 4.1 gallons of water containing 0.3 lb. of borax and the cooked solution prepared above is added. The resultant adhesive has a viscosity of 23 seconds and the thixotropic index is only 1.75.

*Example Ib.*—A commercially available carboxymethyl starch, Solvitose C–5 (1.5 lb.) is slurried in 1.0 gallon of water; a solution of 0.30 lb. of caustic soda dissolved in an equal weight of water is added and the thick paste is cooked 15 min. at 170° F. After cooling with 1 gallon of cold water, the dispersion is ready to be added to the secondary portion of the adhesive as described in Example Ia. The viscosity of the adhesive is 26 seconds and the thixotropic index is 2.30.

It is advantageous to use the modified carrier in conjunction with any flour or starch source in the "secondary" or raw dispersion which contains over .05% of unsaturated free fatty acids or which results in the production of highly thixotropic systems when they are used to prepare corrugating pastes in the conventional manner. Mixtures of flours and starches are also satisfactory in this portion of the paste.

*Embodiment II.*—In this embodiment of the invention, the starch or starch bearing material is branched in situ during preparation of the adhesive by incorporating sufficient "branching agent" in the flour which is to be used as the carrier portion of the paste so that when the carrier is prepared by the corrugator under essentially his normal operating procedure, a degree of modification of the starch occurs so that there will no longer be an interaction within the paste which results in the property known as thixotropy. Compounds capable of adding branches to starch under the alkaline conditions which prevail during the preparation of the carrier portion of the paste include ethylene oxide, propylene oxide, acrylonitrile, acrylamide, ethylene chlorohydrin and preferably sodium chloroacetate, but acrylamide and sodium chloroacetate are the most satisfactory for this embodiment because they are non-volatile solids and can be easily blended with flour or the like and furnished in this form.

It must be emphasized that in carrying out Embodiment II I do not supply a modified starch as the carrier for the corrugating adhesive, but an unreacted starch or flour containing a reagent capable of modifying the starch when the carrier is prepared with this material according to conditions essentially the same as normally used for the preparation of a regular starch carrier. Thus there is incorporated in the starch or flour to be used as the carrier portion of the paste an amount of sodium chloroacetate sufficient for accomplishing the desired degree of modification of the carrier. During preparation of the carrier, the starch or flour is added to water in a conventional mixer found in corrugating plants and the caustic soda solution is added. The suspension is heated to gelatinize and disperse the starch. The caustic soda serves not only to gelatinize and disperse the starch, but to drive the reaction between starch and sodium chloroacetate to completion. After a sufficient time to give the desired degree of dispersion, the mass is cooled by dilution with water and is then ready to add to the conventionally prepared "secondary" portion of the paste i.e., a suspension of raw flour in water containing borax or other aids capable of yielding a quick setting adhesive. The reaction which occurs between the starch and the sodium chloroacetate can be represented by the following equation:

EQUATION 1

$$R-(OH) + ClCH_2COO\ Na + NaOH \rightarrow$$
$$R(OH)_{x-1}OCH_2COONa + NaCl + H_2O$$

Thus, starch is represented as a polyhydroxylated compound which reacts with sodium chloroacetate to produce the sodium salt of a partially substituted carboxymethyl starch.

*Amount of sodium chloroacetate in the carrier.*—The degree of thixotropy in a corrugating paste is a function of the percentage of unsaturated free fatty acid in the flour. The thixotropy does, however, reach a maximum level indicating the amylose becomes saturated with fatty acid. This is illustrated by the data in Table A.

TABLE A

[Effect of added free fatty acid upon thixotropy of starch corrugating adhesive.]

| Percent Oleic Acid Added | Brookfield Viscosity @ 2 r.p.m. (#2 spindle) (centipoise) | Brookfield Viscosity @ 20 r.p.m. (#2 spindle) (centipoise) | Thixotropic Index (2/20 value) |
|---|---|---|---|
| none | 350 | 190 | 1.8 |
| 0.085 | 760 | 370 | 2.1 |
| 0.170 | 7,900 | 1,300 | 6.1 |
| 0.350 | ¹18,500 | ¹2,700 | 6.9 |
| 0.700 | ¹21,000 | ¹3,140 | 6.8 |
| 1.40 | ¹21,000 | ¹3,000 | 7.0 |

¹ Number 3 spindle.

Thus when the level of oleic acid exceeds 0.35% of the starch in the paste, there is no further increase in apparent viscosity. The amount of sodium chloroacetate which is required in the carrier to eliminate the thixotropic effect in the finished adhesive is a function of the concentration of free fatty acid in the flour. The concentration of free fatty acid in corn flour is usually a function of the length of time which the corn has been stored and the temperature and humidity conditions under which storage has occurred. Thus the free fatty acid increases with length of storage, moisture and temperature conditions. Normally, corn has a free fatty acid content of less than 0.15% and a satisfactory level of sodium chloroacetate in the carrier is 5-7%. A range of 2-20% of sodium chloroacetate should cover any type of cereal which is normally encountered. Sodium chloroacetate is the preferred source of the chloroacetate radical because it is non-irritating, stable and economical. It may be readily blended with the flour or starch and shipped as a premixed blend to the corrugating plant for use in the carrier portion of the paste. This invention, however, is not limited to such a pre-mix, inasmuch as it is feasible for the corrugating plant to use ordinary flour or starch in the carrier and to add the modifying chemical as the carrier is being prepared. Although the sodium salt is preferred for the reasons enumerated, other water soluble salts, particularly the potassium salt, could be substituted. Furthermore, although chloroacetic acid is highly corrosive and deliquescent, nevertheless, with proper precautions it also could serve as a source of the chloroacetate radical either by premix to the flour or starch to be used as a carrier, or by the corrugator during preparation of the paste. In this case it is necessary that sufficient additional caustic soda be added to neutralize the free acid or carboxyl group.

The amount of caustic soda which is normally added to a corrugating paste is governed by the gelatinization temperature of the starch which is desired. Generally the caustic level is 2.0-3.0% of the starch. It can be seen from the beforementioned Equation 1 that caustic soda is required to neutralize the hydrochloric acid which is normally formed by the condensation of starch with sodium chloroacetate. Thus in addition to the 2.0-3% of caustic soda normally added, the corrugator must add an additional amount dependent on the amount of modifying agent which is present. Thus, an additional .34 lbs. of caustic soda must be added for each pound of sodium chloroacetate which is present in the flour used for the carrier.

*Amount of water used in cooking the carrier*

If excess water is present during the cooking of the carrier portion of the paste, considerable sodium chloroacetate in the paste is wasted by the hydrolysis reaction of Equation 2.

EQUATION 2

$ClCH_2COO\ Na + NaOH \rightarrow HOCH_2COO\ Na + NaCl$

The gelatinization of the starch in flour during cooking increases the viscosity enormously. It is advantageous to use the lowest level of water which results in a manageable reaction medium during cooking. In order to reduce hydrolysis of the sodium chloroacetate, I have found that if the cooking of flour with the modifying agent present is conducted in a restricted amount of water so that approximately 25% of flour is present in the slurry used to prepare the gel, excellent results are obtained. The degree of conversion is reduced as the amount of water is increased. Similarly, even better results could be obtained at higher flour concentrations if the mixing equipment is capable of agitating the gelatinized mass. By comparison, a 15-20% concentration of starch in the cooked gel is conventionally recommended to the corrugator by the starch supplier.

*Temperature of cook and time of cook*

Generally a cooking time of 15 minutes at a temperature of 155-175° F. is recommended for the dispersion of starch under the prevailing alkaline conditions for the production of the carrier for the corrugating adhesive. These same conditions are satisfactory for the conversion of starch by sodium chloroacetate during the cooking procedure. Longer cooking and higher temperatures are not harmful to the reaction efficiency. The conditions specified are generally considered minimum for proper dispersion of the starch itself.

*Starch source*

While corn flour is preferred for the preparation of the carrier to be used in conjunction with a raw flour suspension, nevertheless the source of starch for the carrier may include not only cereal flours such as wheat, grain sorghum and rye, but also cereal starches and tuber starches such as corn starch, wheat starch, potato starch, and tapioca starch.

The following specific examples are typical ways in which Embodiment II of the invention may be carried out:

Example IIa below is illustrative of my invention whereby the undue thixotropy in pastes prepared with very high free fatty acid is completely eliminated by incorporation of sodium chloroacetate in the flour used for preparing the carrier portion of the adhesive.

*Example IIa.*—Corn flour (1.5 lbs.) and sodium chloroacetate (0.18 lb.) are added to 0.45 gallon of water; then 0.45 lb. of NaOH dissolved in an equal weight of water is added. The mixture is heated to 170° F. and held 15 min. with stirring. Then 1.5 gal. of cold water is added and the dilute carrier is ready to be added to the suspension of flour with high fatty acid content prepared by suspending 10.5 lbs. of such flour in four gal. of water containing .265 lb. borax. The viscosity of the finished paste is 30 sec. after stirring 1 hr. and the thixotropic index is 2.0.

Example IIb illustrates the concepts of my invention wherein the carrier is to be used for a paste prepared with flour of normal fatty acid content. This particular carrier was prepared with a mixture of corn starch and a low level of sodium chloroacetate. Corn flour, however, may be substituted for corn starch in the carrier with equivalent results.

*Example IIb.*—A mixture of pearl corn starch (1.6 lbs.) and sodium chloroacetate (.08 lb.) are added to 0.45 gallon of water and then 0.42 lb. of caustic soda dissolved in an equal weight of water are added. The mixture is cooked and cooled as in Example IIa and then mixed with aqueous suspension of raw flour of normal fatty acid content. The viscosity is 35 seconds and the thixotropic index is 1.8.

Example IIc illustrates the invention in the instance where monochloroacetic acid is used in preparing the carrier and additional caustic soda is added to neutralize the carboxyl group during preparation of the carrier.

*Example IIc.*—The carrier is prepared by adding a mixture of 1.6 lbs. corn flour and 0.2 lb. of monochloroacetic acid to 1.8 qts. of water. A solution of 0.49 lb. of caustic soda in an equal weight of water is added and the mixture is cooked at 170° F. for 15 min. Two gallons of water are added and the carrier is satisfactory for preparing an adhesive free of thixotropy with corn flour of very high free fatty acid.

Example IId illustrates the invention whereby the ungelatinized portion of the paste is prepared with a mixture of corn flour and corn starch and the gelatinized carrier portion is prepared with corn flour containing a small proportion of sodium chloroacetate.

*Example IId.*—The carrier is prepared by adding a mixture of 1.6 lbs. corn flour and 0.08 lb. of sodium chloroacetate to 1.8 qts. of water. A solution of 0.42 lb. of caustic soda in an equal weight of water is added and the mixture is cooked at 170° F. for 15 min. Two gallons of water are added and this paste is then added to a slurry of 5.25 lbs. of corn flour and 5.25 lbs. of corn starch in 4 gallons of water containing 0.265 lb. of borax.

The invention includes the use of the modified carrier in conjunction with a 100% starch paste, as it produces excellent flow characteristics in such a paste which, from the thixotropic index, appear to be superior to regular starch pastes. This results in more efficient spread of the adhesive and the possibility of obtaining thinner glue lines. Example IIe illustrates the preparation of this type of paste.

*Example IIe.*—Pearl corn starch (1.5 lb.) and sodium chloroacetate (0.08 lb.) are mixed and then added to 0.45 gallon of water. Then 0.42 lb. of caustic soda is added. The mixture is cooked and cooled as in Example IIa and this carrier is then added to a suspension of 10.5 lbs. of pearl corn starch in 4.1 gal. of water in which 0.265 lb. of borax has been dissolved. The cup viscosity was found to be 25 sec. and the thixotropic index 1.5. The thixotropic index of a regular pearl starch paste prepared in this manner and having a similar cup viscosity is 1.8.

Example IIf illustrates a variation of the invention wherein the starch used in the carrier is branched during the cooking operation by the reagent acrylonitrile, forming a starchy carrier containing cyanoethyl branches.

*Example IIf.*—Corn flour (1.5 lb.) is slurried in 1 gallon of water and 0.15 lb. of acrylonitrile is added. Then 0.35 lb. of caustic soda in an equivalent weight of water is added and the mixture is heated to 170° F. and held 15 min. One gallon of cold water is then added and the carrier thus prepared is added to the secondary portion of the adhesive containing 10.5 lb. of corn flour suspended in 4.1 gallons of water and containing 0.3 lb. of borax. The thixotropic index of this adhesive was found to be 2.0.

Example IIg illustrates the invention wherein the branching agent added to the flour prior to the preparation of the carrier portion of the adhesive is acrylamide. This reagent reacts in situ to produce a mixture of carbamidoethyl and carboxyethyl branches on the starch content of the flour and the undue thixotropic property of the final adhesive is eliminated.

*Example IIg.*—Corn flour (1.5 lb.) is slurried in 1 gal. of water and 0.15 lb. of acrylamide is added. Then 0.35 lb. of caustic soda is added as a solution in an equivalent weight of water. The suspension is then heated for 15 min. at 170° F. and then cooled with 1 gal. of water. When added to a suspension of 10.5 lb. of corn flour of high free fatty acid content in 4.1 gal. water containing 0.3 lb. of borax in solution an adhesive will be obtained with a viscosity of 30 sec. and a thixotropic index of 2.1.

*Embodiment III.*—As a third alternate embodiment of the invention, in which the starchy carrier of a corrugating adhesive is free of or of greatly reduced linear amylose content, it is possible to use as a raw material starch or flour from a genetic modified cereal grain which is very low in or devoid of the amylose component of starch. These are known as the waxy varieties of the cereal such as waxy corn or waxy sorghum. Starch from the waxy variety of corn is known by the trade name of "Amioca."

This embodiment is illustrated in Example IIIa below:

*Example IIIa.*—Waxy maize flour (1 lb. 10 oz.) is slurried in 1 gal. of water. Then 0.35 lb. of caustic soda in an equivalent weight of water is added. After cooking for 15 minutes at 170° F. the dispersion is cooled with 1 gal. of water and the resultant viscous carrier is added to a suspension of 10.5 lb. of regular corn flour in 4.1 gal. of water, containing 0.3 lb. of borax in solution. The paste viscosity was found to be 28 seconds and the thixotropic index was 2.0.

In the claims the expression "substantially devoid of linear amylose fractions" when applied to the starchy material comprehends starchy material which is either amylose free, of reduced amylose content, or in which the amylose fraction contains sufficient chemical branches that its viscosity is no longer affected by unsaturated free fatty acid.

Various changes and modifications may be made without departing from the spirit of the invention, and all of such changes are contemplated, as may come within the scope of the claims.

What I claim is:

1. A fluid potential adhesive mixture comprising a suspension formed of a potentially adhesive ungelatinized material containing over .05% of unsaturated free fatty acids and adapted to be converted by heat and selected from a group consisting of starch and natural cereal starch-bearing products, and a viscous aqueous carrier for said suspension and containing alkali metal hydroxide in an amount to yield a pH of 11.0 to 12.7, said carrier being composed of a substantial quantity of material selected from a group consisting of starch and natural cereal starch-bearing products, the amylose fraction of which material is composed of anhydroglucose groups chemically modified so as to contain in the range of one to ten carboxymethyl branches for each thirty anhydroglucose groups.

2. A fluid potential adhesive mixture comprising a suspension formed of a potentially adhesive ungelatinized material containing over .05% of unsaturated free fatty acids and adapted to be converted by heat and selected from a group consisting of starch and natural cereal starch-bearing products, and a viscous aqueous carrier for said suspension and containing alkali metal hydroxide in an amount to yield a pH of 11.0 to 12.7, said carrier being composed of a substantial quantity of material selected from a group consisting of starch and natural cereal starch-bearing products modified with an etherifying agent from a group consisting of alkali metal chloroacetate and chloroacetic acid so as to contain in the range of one to ten carboxymethyl branches for each thirty anhydroglucose groups.

3. A fluid potential adhesive mixture comprising a suspension formed of a potentially adhesive ungelatinized material containing over .05% of unsaturated free fatty acids and adapted to be converted by heat and selected from a group consisting of starch and natural cereal starch-bearing products, and a viscous aqueous carrier for said suspension and containing alkali metal hydroxide in an amount to yield a pH of 11.0–12.7, said carrier being composed of a substantial quantity of gelatinized material selected from a group consisting of starch and natural cereal starch-bearing products the amylose fraction of which is composed of anhydroglucose groups chemically modified by 2–20% of an etherifying agent from the group consisting of alkali metal chloroacetate and chloroacetic acid so that the amylose fraction contains in the range of one to ten carboxymethyl branches for each 30 anhydroglucose groups.

References Cited in the file of this patent

UNITED STATES PATENTS

| | | |
|---|---|---|
| 2,051,025 | Bauer | Aug. 18, 1936 |
| 2,316,129 | Bock et al. | Apr. 6, 1943 |
| 2,500,950 | Konigsberg | Mar. 21, 1950 |
| 2,599,620 | Filbert | June 10, 1952 |

FOREIGN PATENTS

| | | |
|---|---|---|
| 520,540 | Belgium | Dec. 8, 1953 |